United States Patent

[11] 3,545,356

| [72] | Inventor | Jens C. Nielsen<br>3910 S. E. 65th Ave., Portland, Oregon 97215 |
|---|---|---|
| [21] | Appl. No. | 816,158 |
| [22] | Filed | April 7, 1969<br>Continuation of Ser. No. 562,875,<br>July 5, 1966, abandoned. |
| [45] | Patented | Dec. 8, 1970 |

[54] CAMERA TELESCOPE APPARATUS FOR GUNS
2 Claims, 8 Drawing Figs.

[52] U.S. Cl. ............................................. 95/12;
352/95, 352/243
[51] Int. Cl. .................................................. G03b 29/00
[50] Field of Search ......................................... 95/12;
352/95, 243

[56] References Cited
UNITED STATES PATENTS

| 1,318,803 | 10/1919 | Robertson | 352/131 |
| 2,011,358 | 8/1935 | Gaty | 95/1.1X |
| 2,182,097 | 12/1939 | Schenk | 95/42 |
| 2,282,680 | 5/1942 | Sonne | 95/12 |
| 2,753,760 | 7/1956 | Braymer | 95/12X |
| 3,008,396 | 11/1961 | Mito | 95/12 |

*Primary Examiner*—John M. Horan
*Attorney*—Eugene M. Eckelman

ABSTRACT: The invention includes a camera-telescope in combination with a gun. To accomplish the object of the invention, a camera is combined in structure with a telescope and this combination is attached to a gun. In such attached position, the camera is arranged to photograph the image of the telescope. Control means are provided adjacent to the hand grip of the gun and are arranged to operate the camera independently of the gun so that said camera can be used to take pictures while sighting the gun or when shooting, or both.

PATENTED DEC 8 1970

3,545,356

INVENTOR.
JENS C. NIELSEN
BY Eugene M. Eckelman
ATTORNEY

CAMERA TELESCOPE APPARATUS FOR GUNS

This application is a continuation of U.S. Pat. application Ser. No. 562,875 filed July 5, 1966, now abandoned.

This invention relates to a camera telescope apparatus for guns.

It is often desirable when hunting to take pictures of surrounding territory or game. This requires the carrying along of camera equipment, and if distance shots are desired the camera equipment must include expensive telephoto-type lens. The carrying of such camera equipment is awkward and prevents efficient handling of the gun since it must be put in an out-of-the-way position when the gun is in use. Furthermore, a camera with telephoto lens is expensive. Since a great share of the hunters use telescopes on their guns, it is a primary objective of the present invention to provide a combination of a camera with that type of telescope which is mountable on a gun whereby the telescope comprises the telephoto lens of the camera and the latter is carried directly on the gun. The camera is thus always in readiness for operation, is easy to carry, and is inexpensive since it uses the telescope as its telephoto lens. In addition, the hunter can aim the gun directly at the object desired and take pictures of the same, and at the same time have the gun in sighted position for shooting at the object any time he desires.

Another object is to provide a combination camera telescope apparatus for guns which employs operating means for the camera located on the gun for convenient manipulation by the hunter.

Still another object is to provide a combination camera telescope apparatus for guns employing novel embodiments one of which utilizes an integrated camera and telescope and the other of which utilizes a camera disconnectable with the telescope whereby said camera may be installed when needed.

Still another object is to provide a novel arrangement of movie camera and telescope wherein a reciprocating mirror is synchronized with the shutter of the camera and allows an image to pass alternately through the shutter and the telescope.

Yet another object is to provide a combination camera telescope apparatus for guns which has a novel arrangement of image reflecting means and connection between the camera and telescope whereby the camera lies flat in substantially the plane of the telescope to prevent any appreciable vertical projection on the telescope.

Additional objects and advantages will become apparent from the following description taken in connection with the accompanying drawings which illustrate a preferred form of the device.

Figure 1:
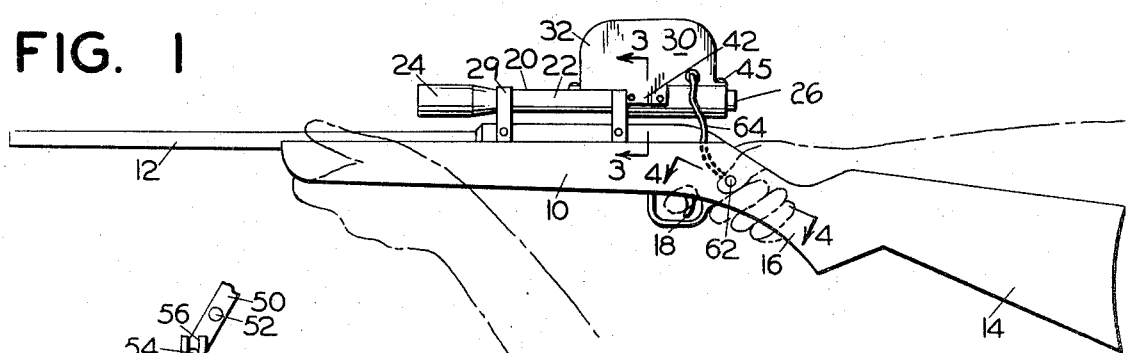
FIG. 1 is a side elevational view of one form of the present camera telescope in combination with a gun.
Figure 2:
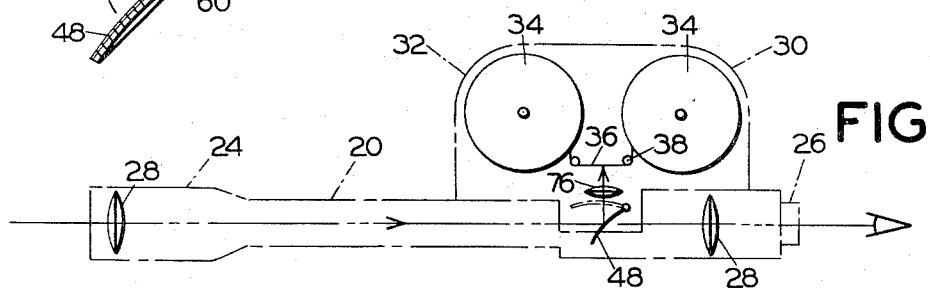
FIG. 2 is an enlarged side elevational view, some of the parts being shown diagrammatically.

Referring now in particular to FIGS. 1 and 2, the numeral 10 designates a conventional gun having a barrel 12, a stock 14 with a grip portion 16, and a trigger 18. In many instances, a telescope 20 is mounted on the gun and is sighted in with the gun for distant firing at game. These telescopes in the usual structure have an outer tubular casing 22 with an open or prism end 24 and an eyepiece or viewing end 26, as well as an arrangement of lenses 28. Such telescopes are secured to the gun 10 in many different ways, one of which is illustrated in FIG. 1 and comprises a pair of clamp brackets 29.

According to the present invention, a motion picture camera 30 is combined with the usual gun mounted telescope 20 and means are provided for transferring the image of the telescope to the camera. In FIG. 2 the numeral 32 designates the housing of the camera, the numeral 34 designates the film spools or reels, and the numeral 36 designates the film which operates on the spools. In the embodiment of FIG. 2, the film 36 passes over guide rollers 38 which cause a portion of the run of the film to lie in a plane parallel to the axis of the telescope.

Figure 3:
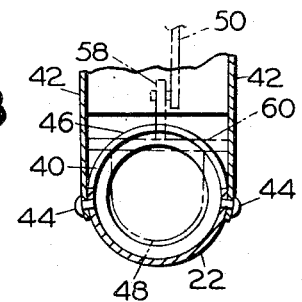
FIG. 3 is an enlarged, fragmentary sectional view taken on the line 3-3 of FIG. 1.

The structure of the telescope and camera so far described is conventional, and in accordance with one concept of the invention the camera is secured to the telescope intermediate the ends of the latter. For this purpose, the telescope has an arcuate portion 40 of its casing 22 cut away, FIGS. 1 and 3, and the casing 32 of the camera has sidewall extensions 42 which engage the casing 22 of the telescope tangentially on opposite sides thereof and span longitudinally the length of the cutaway portion 40. Securement of the camera to the telescope is accomplished by screws 44 at the extensions 42 as well as other fasteners 45, FIG. 1, as needed. The casing 32 of the camera is contoured at 46, FIG. 3, at the ends of the extensions 42 whereby to provide a tight, lightproof seating connection with the telescope.

Figure 5:
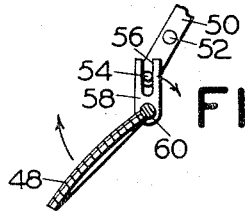
FIG. 5 is a detail view, in enlarged form, of image reflecting means forming a part of the present invention.

The numeral 48, FIG. 2, represents a reflecting member such as a mirror, and this mirror is associated with shutter mechanism of the camera, not shown, whereby to intercept, in a lowered position thereof, the image of the telescope, as will be now explained in greater detail. As is well understood, the shutter mechanisms of motion picture cameras operate at uniform intervals to produce frames on the film, and with reference to FIG. 5, the numeral 50 represents a power driven arm pivotally attached at 52 to the camera and arranged to operate the shutter mechanism. This arm engages, by means of a right angle pin 54 thereon, the slot 56 of a lever 58 pivotally attached to the camera by means of a pin 60 and integrated with one end of the mirror 48. It is apparent that upon reciprocating pivotal movement of arm 50 to operate the shutter mechanism, the mirror 48 is reciprocated between a downwardly depending position, as shown in full lines in FIG. 2, to an upper substantially horizontal position, as shown in phantom lines in this same FIG. As also shown in FIG. 2, the mirror is mounted such that in its downwardly depending position it intercepts the image of the telescope and reflects it into the shutter mechanism and in its upper position it is out of the way of said image whereby the latter is visible through the eyepiece end of the telescope. The mirror is synchronized with the shutter mechanism so that the latter is open when the mirror is in its downward reflecting position. As is apparent, the mirror itself may comprise the shutter for selectively transferring the image to the film.

Figure 4:
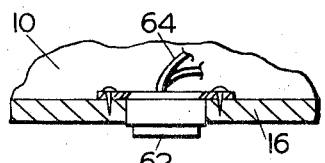
FIG. 4 is an enlarged, fragmentary sectional view taken on the line 4-4 of FIG. 1.

It is desired that the camera be operated by control mechanism located adjacent to one of the hand grip positions for holding the gun. As an illustration, an operating button 62, FIGS. 1 and 4, is mounted on the grip portion 16 of the gun so that one of the fingers of the hunter's hand which hold onto the gun at this point can operate the button. Such button can be included in an electric circuit having wires 64 which lead to electric power drive means, not shown, for the camera. Although it has been suggested herein that the camera be electrically driven, it is to be understood of course that it could be spring wound, in which case the button 62 would operate a flexible cable or similar means extending to the motor.

In the use of the present device, the camera is secured to the telescope, and the latter is secured to the gun. Such telescope is sighted in with the gun, the normal position of the mirror 48 being in its upper position so that the image of the telescope is viewable through the eyepiece portion 26. When the hunter desires to view game or the like he sights through the telescope, as in the usual procedure, and if he desires to take pictures of the game he can then operate the camera. If he desires to shoot, the image would be clear whether or not he maintains the camera in action at that time.

Figure 6:
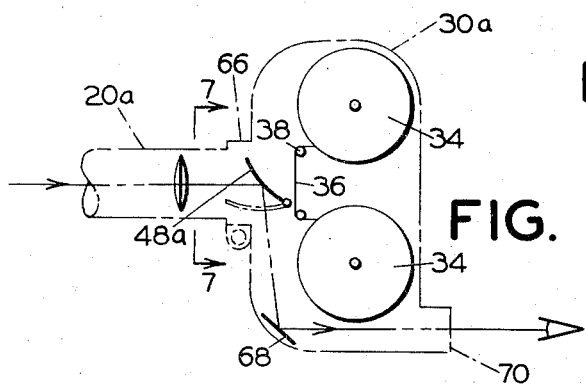
FIG. 6 is a plan view, partly diagrammatic, of a second embodiment of the invention.
Figure 7:
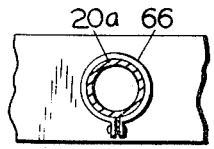
FIG. 7 is a sectional view taken on the line 7-7 of FIG. 6.

FIG. 6 illustrates an embodiment of the invention wherein a camera 30a is secured on the eyepiece end of a telescope 20a, and has as its chief purpose, as distinguished from the embodiment of FIG. 1, to lie flat in a horizontal plane rather than to project vertically. The connection of the camera in FIG. 6 to the telescope is a detachable connection 66, also seen in FIG. 7, wherein the lens end of such camera has a clamp bracket 66 which clamps on the end of the telescope 20a.

Figure 8:
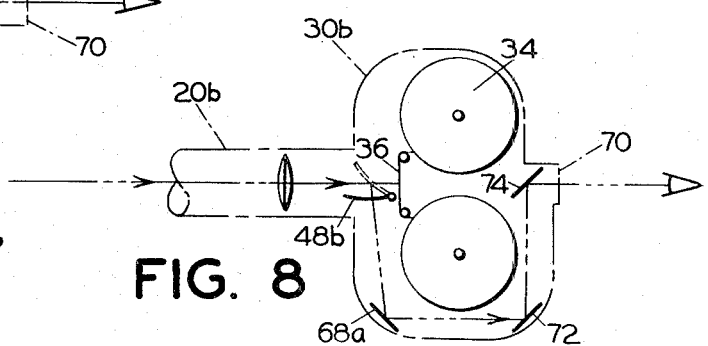
FIG. 8 is a plan view, partly diagrammatic, of still a further embodiment of the invention.

Similar to the embodiment of FIG. 1 the camera in FIG. 6 is illustrated as having reels 34, film 36, and guide rollers 38 for the film. In this embodiment the reciprocating mirror 48a is mounted such as to allow the image to reach the film portion 36 or to reflect it to another mirror 68 arranged to transfer the image straight rearwardly through a viewing aperture 70 provided in the camera. The embodiment of FIG. 8 shows a telescope 20b which differs from the embodiment of FIG. 6 to the extent that the camera casing 30b is integrated with the telescope and in addition provides the viewing aperture 70 in a position centrally of the camera casing. The similarly employed reciprocating mirror 48b is capable either of reflecting the image onto the film 36 through the shutter or to transfer the image to other mirrors, comprising the mirrors 68a, 72 and 74, such mirrors being located to transfer the image to the viewing aperture 70.

According to the present invention there is provided an arrangement wherein the telescope mounted on a gun is utilized as the telephoto lens for a camera. The invention has the one advantage that the hunter can follow game or the like through the telescope and take pictures thereof as he follows the game. In addition he may fire when he feels the time is appropriate. A second important advantage is that he does not have to carry a camera as separate equipment, and even further an inexpensive set up is provided since the telescope serves as telephoto lens for the camera. Although the present camera telescope has been illustrated for use by hunters, it could as well be used by others such as by the military or by the police. There is generally no optics problem in the reflecting of the image from the telescope to the camera by the mirrors 48, 48a and 48b. If focusing is not exactly true, an auxiliary lens 76, FIG. 2, may be used in the camera.

It is to be understood that the forms of my invention herein shown and described are to be taken as a preferred example of the same and that various changes in the shape, size and arrangement of parts may be resorted to without departing from the spirit of my invention. For example, the camera may be a still camera rather than a motion picture camera.

I claim:

1. In combination with a gun having a hand grip portion and operating means for firing the gun, a telescope sighted in with said gun for viewing at close range the target of the gun, means mounting said telescope on said gun, a motion picture camera on said telescope having shutter mechanism and arranged to photograph the image from said telescope, a reciprocating mirror in said camera, means in said camera for moving film along a selected path for exposure to said shutter mechanism, said mirror being synchronized with the shutter mechanism and having reciprocating movement to alternately direct the image from the telescope through the shutter mechanism and through said telescope, and control means for operating said camera, said control means being disposed adjacent to said hand grip portion of said gun and arranged to operate said camera, said control means for the camera being independent of the operating means for firing the gun whereby said camera is operated independently of the firing of said gun.

2. The combination of claim 1 wherein said telescope has an eye piece and said camera is mounted on said eye piece end as an extension of said telescope to photograph the image from said telescope, means defining a viewing aperture in said camera out of the path of viewing of said telescope, and stationary mirror means in said camera directing the image viewable through said telescope to said viewing aperture.